UNITED STATES PATENT OFFICE.

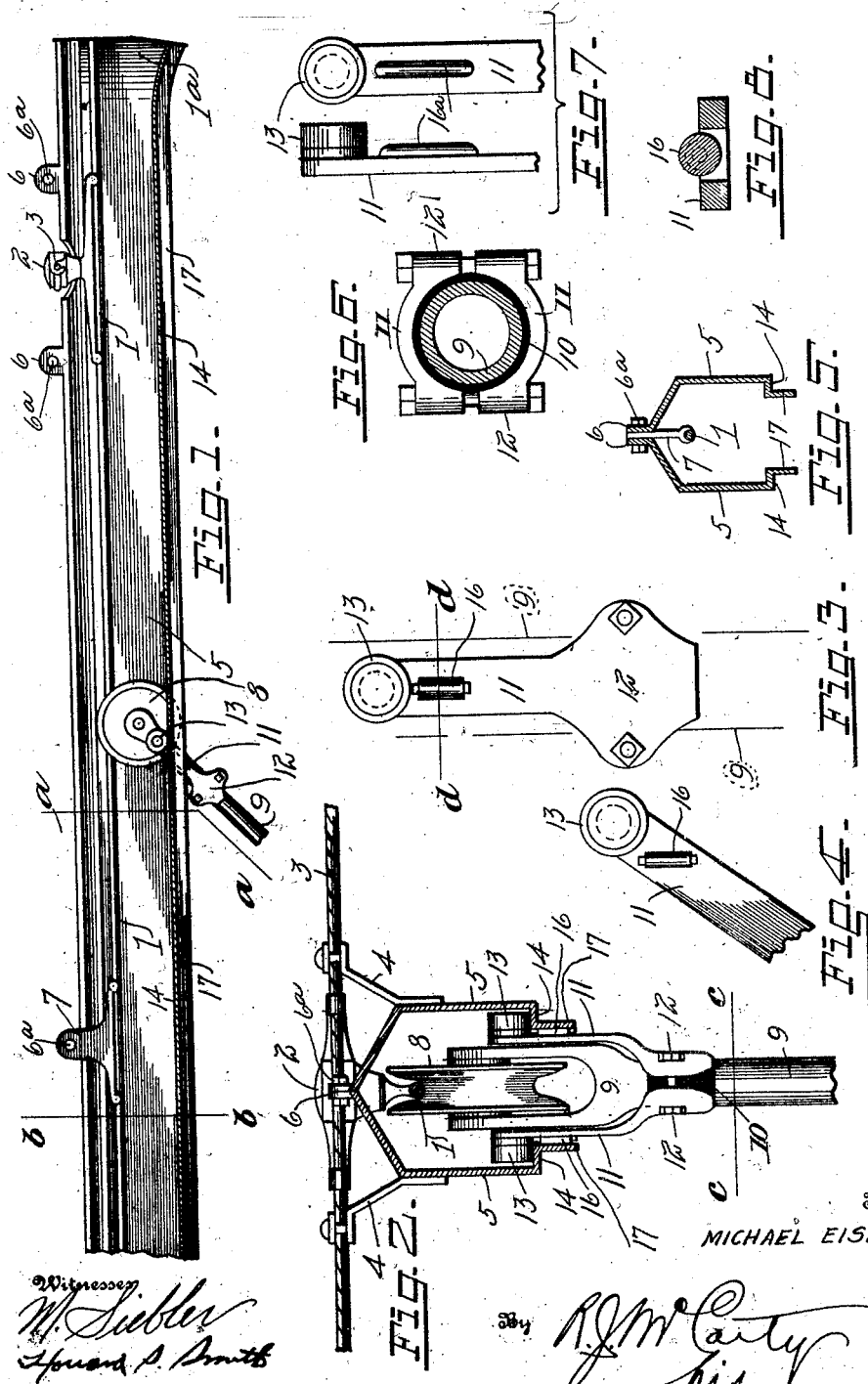

MICHAEL EISELE, OF WEST CARROLLTON, OHIO.

TROLLEY-GUARD.

976,859. Specification of Letters Patent. Patented Nov. 29, 1910.

Application filed November 19, 1909. Serial No. 528,966.

*To all whom it may concern:*

Be it known that I, MICHAEL EISELE, a citizen of the United States, residing at West Carrollton, in the county of Montgomery and State of Ohio, have invented certain new and useful Improvements in Trolley-Guards; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in trolley guards. The device is especially adapted to be used at railroad crossings.

The object of the invention is to provide a trolley guard to be placed around a trolley wire to prevent the trolley wheel from leaving the wire and to protect the trolley wheel from ice. The device is cheaply constructed and may easily be placed around the wire without disturbing the existing guy wires.

In the accompanying drawings, Figure 1 is a longitudinal sectional elevation of the device showing a trolley wheel passing through the guard. Fig. 2 is an enlarged sectional view on the line $a$—$a$ of Fig. 1. Fig. 3 is a detail view of one of the supporting members for the adjustable rollers the broken lines in this view represent the position of the trolley pole. Fig. 4 is a detail view showing a modification in the position of the anti-friction rollers. Fig. 5 is a section on the line $b$—$b$ of Fig. 1. Fig. 6 is a section on the line $c$—$c$ of Fig. 2. Fig. 7 is a modified form of the roller supporting bracket. Fig. 8 is a section on the line $d$—$d$ of Fig. 3.

Throughout the specification and drawings, similar reference characters indicate corresponding parts.

In the drawings, 1 designates a trolley wire which is supported by the usual insulators 2 mounted on guy wires 3. Surrounding said trolley wire, and supported upon said guy wires 3, by means of brackets 4, is a guard or inverted trough formed of two parts 5—5 which are provided with ears or extensions 6—6 by means of which, in connection with bolts 6ª, the two parts of the guard are held together. The two parts of the guard are cut away to encircle the insulators 2, and said guard is also provided with insulators 7 which prevent the trolley wire from touching the inner side of the guard. This construction prevents the guard from becoming charged from the wire. The guard is suitably flared as at 1ª, Fig. 1, to allow the trolley wheel 8 to easily enter said guard.

The trolley wheel 8, which engages the trolley wire 1 in the usual manner, is mounted on the end of a trolley rod 9 attached to a car not shown. Mounted on the trolley rod 9, and insulated therefrom by means of fiber 10, or other suitable material, are two brackets 11 which are adjustably attached to said rod by means of a clamp 12. The upper ends of said brackets are provided with studs or rollers 13 which engage flanges 14 on the two side portions 5—5 of the guard. The said rollers are mounted adjustably to suit the various sizes of wheels 8. The engagement of said rollers and the flanges 14 prevent the trolley wheel from leaving the wire and thus a closed circuit is maintained through the car, which will prevent the car from stopping, due to lack of current, at any place where the guard is installed, as at a railroad crossing. It will be understood that the device is ordinarily used on a straight track, but it is also adapted to be used on a curve. In this case a suitable number of insulators 7 is provided, which are attached to the guard by means of extensions 6 and bolts 6ª, and which prevent the trolley wire 1 from touching the guard.

To prevent excessive friction between the brackets 11 and the flanges 14, when the trolley wheel is passing through the guard, the said brackets are provided with rollers 16 which engage secondary flanges 17 projecting from the flanges 14. These rollers 16 act as anti-friction devices and prevent wear of the parts. The rollers 16 may be placed at an angle as shown in Fig. 4, or they may be entirely eliminated and reinforcements 16ª which are integral with the brackets 11, substituted as shown in Fig. 7.

I claim:

1. In a device of the type specified, a trolley wire, a guard opened at its lower side and surrounding said wire, the lower open side of said guard being provided with inwardly and downwardly extending flanges, a trolley rod, a wheel mounted on said rod and engaging said wire, adjustable brackets mounted on said rod, and rollers mounted on said brackets and adapted to engage the inwardly and downwardly extending flanges of the trolley guard.

2. A trolley guard consisting of a casing inclosing the trolley wire and wheel, the lower portion of said guard or casing being open to permit the passage of the supporting rod of the trolley wheel, and the lower portion of said guard or casing terminating in inwardly and downwardly extending bearings 14 and 17, adjustable brackets mounted upon the trolley wheel support, and two series of rollers mounted on said brackets and engaging the inwardly and downwardly extended bearings of the trolley guard.

In testimony whereof I affix my signature, in presence of two witnesses.

MICHAEL EISELE.

Witnesses:
MATTHEW SIEBLER,
HOWARD S. SMITH.